(12) United States Patent
Davis

(10) Patent No.: US 6,226,950 B1
(45) Date of Patent: *May 8, 2001

(54) MODULAR CLADDING ELEMENT

(75) Inventor: Harry H. Davis, Mooresville, NC (US)

(73) Assignee: L.B. Plastics Limited, Darby (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/273,372

(22) Filed: Mar. 22, 1999

Related U.S. Application Data

(63) Continuation-in-part of application No. 09/152,721, filed on Sep. 14, 1998, and a continuation-in-part of application No. 08/917,409, filed on Aug. 25, 1997, now Pat. No. 5,956,920, which is a continuation-in-part of application No. 08/798,828, filed on Feb. 12, 1997, now Pat. No. 5,819,491, which is a continuation-in-part of application No. 08/589,728, filed on Jan. 22, 1996, now Pat. No. 5,647,184.

(51) Int. Cl.$^7$ ..................................... E04F 15/02
(52) U.S. Cl. ............................ 52/592.1; 52/100; 52/177; 52/588.1
(58) Field of Search .................. 52/177, 100, 588.1, 52/579, 592.1, 592.4; 404/41

(56) References Cited

U.S. PATENT DOCUMENTS

| | | | |
|---|---|---|---|
| 3,413,775 | * | 12/1968 | Katz . |
| 3,810,337 | * | 5/1974 | Pollard . |
| 4,021,987 | * | 5/1977 | Schnebel et al. . |
| 4,467,584 | * | 8/1984 | Crites et al. . |
| 4,848,056 | * | 7/1989 | Kelly . |
| 4,892,052 | * | 1/1990 | Zook et al. . |
| 4,951,992 | * | 8/1990 | Hockney ........................ 52/588.1 X |
| 5,048,448 | * | 9/1991 | Yoder . |
| 5,050,362 | * | 9/1991 | Tal et al. . |
| 5,222,344 | * | 6/1993 | Johnson . |
| 5,335,471 | * | 8/1994 | Kupiec . |
| 5,647,184 | * | 7/1997 | Davis ................................ 52/592.1 |
| 5,811,035 | * | 9/1998 | Mockry ........................ 52/588.1 X |
| 5,816,010 | * | 10/1998 | Conn ................................. 52/588.1 |
| 5,819,491 | * | 10/1998 | Davis ................................ 52/592.1 |
| 5,956,920 | * | 9/1999 | Davis ........................ 52/588.1 X |

FOREIGN PATENT DOCUMENTS

| | | | | |
|---|---|---|---|---|
| 43718 | * | 1/1974 | (AU) ................................ 52/588.1 |
| 2125841 | * | 3/1984 | (GB) ................................... 52/177 |

\* cited by examiner

*Primary Examiner*—Laura A. Callo
(74) *Attorney, Agent, or Firm*—Adams, Schwartz & Evans, P.A.

(57) ABSTRACT

A modular cladding element cooperates with an assembly of cladding elements to clad a surface of an underlying structure. The cladding element includes a cladding panel having opposed inside and outside major surfaces, first and second opposed sides, and first and second opposed ends. A removable male fastener is integrally formed along the first side of the panel, and is adapted for entering a complementary fastener of an adjacent cladding element when positioned on the first side of the panel. The male fastener is removable in the absence of a complementary cladding element positioned on the first side of the panel. A first female fastener is integrally formed along the opposed second side of the panel, and defines a first opening adapted for receiving a complementary fastener of an adjacent cladding element positioned on the second side of the panel. A second female fastener is integrally formed adjacent the male fastener on the first side of the panel. Upon removing the male fastener, the second female fastener defines a second opening adapted for receiving a complementary fastener of an adjacent cladding element on the first side of the panel.

11 Claims, 4 Drawing Sheets

MODULAR CLADDING ELEMENT

This application is a continuation-in-part of U.S. Ser. No. 08/917,409, filed on Aug. 25, 1997, now U.S. Pat. No. 5,956,920 and U.S. Ser. No. 09/152,721, filed on Sep. 14, 1998 now pending; which is a continuation-in-part of U.S. Ser. No. 08/798,828, filed Feb. 12, 1997 now U.S. Pat. No. 5,819,491; which is a continuation-in-part of U.S. Ser. No. 08/589,728, filed Jan. 22, 1996 now U.S. Pat. No. 5,647,184.

TECHNICAL FIELD AND BACKGROUND OF INVENTION

The present invention relates to a modular cladding element, and an assembly of cladding elements particularly adapted for covering the surface of an underlying structure, such as a wood deck, porch, or boat pier. The invention provides a generally maintenance free, wear-resistant surface that is attractive, easy to clean, convenient to install, and relatively inexpensive.

Many prior art cladding and modular deck elements are designed to mate with adjacent elements along respective sides using, for example, complementary integrally-formed fasteners. A precise fit and arrangement is generally required in order to properly assemble the elements on the structure being covered. A problem arises when it becomes necessary or desirable to position the elements such that the same type of fasteners of adjacent elements are arranged side by side. In this case, the elements generally cannot be conveniently and readily fitted together.

The present invention addresses this and other problems of the prior art by providing a cladding element which includes more than one fastener type on one or both longitudinal sides of the element. In one embodiment, the invention includes a removable male fastener which, when removed, allows access to a female fastener formed on the same side of the element. The invention thus permits attachment of an adjacent cladding element having either a male or a female fastener.

SUMMARY OF THE INVENTION

Therefore, it is an object of the invention to provide a cladding element adapted for cooperating with a number of other elements to clad the surface of an underlying structure, such as a wood deck.

It is another object of the invention to provide a cladding element which, when assembled with other elements, creates a surface that is generally maintenance free.

It is another object of the invention to provide a cladding element which, when assembled with other elements, creates a surface that is wear-resistant and easy to clean.

It is another object of the invention to provide a cladding element which, when assembled with other elements, creates a surface that is attractive and has no exposed screws or other fasteners.

It is another object of the invention to provide a cladding element which comprises a modular, one-piece, integrally-molded design.

It is another object of the invention to provide a cladding element which is relatively easy to install without the use of separate fastener elements, such as mounting tracks and the like.

It is another object of the invention to provide a cladding element which can be installed either parallel or perpendicular to the boards of the underlying structure.

It is another object of the invention to provide a cladding element which is positioned together with an adjacent cladding element, and whose position is laterally adjustable relative to the position of the adjacent cladding element It is another object of the invention to provide a cladding element which is relatively inexpensive.

It is another object of the invention to provide a cladding element which includes both male and female fasteners located on one or both sides for mating with respective male or female fasteners of an adjacent cladding element.

These and other objects of the present invention are achieved in the preferred embodiments disclosed below by providing a modular cladding element for cooperating with an assembly of cladding elements to clad a surface of an underlying structure. The cladding element includes a cladding panel having opposed inside and outside major surfaces, first and second opposed sides, and first and second opposed ends. A removable male fastener is integrally formed along the first side of the panel, and is adapted for entering a complementary fastener of an adjacent cladding element when positioned on the first side of the panel. The male fastener is removable in the absence of a complementary cladding element positioned on the first side of the panel. A first female fastener is integrally formed along the opposed second side of the panel, and defines a first opening adapted for receiving a complementary fastener of an adjacent cladding element positioned on the second side of the panel. A second female fastener is integrally formed adjacent the male fastener on the first side of the panel. Upon removing the male fastener, the second female fastener defines a second opening adapted for receiving a complementary fastener of an adjacent cladding element on the first side of the panel.

According to one preferred embodiment of the invention, the cladding panel includes a plurality of spaced-apart supporting ribs extending perpendicularly outward from the inside major surface and longitudinally from one end of the panel to the other. The ribs are adapted for spacing the outside major surface of the panel a distance away from the surface of the underlying structure.

According to another preferred embodiment of the invention, the male fastener includes an integrally formed, longitudinal mounting strip. The strip is adapted for engaging the surface of the underlying structure and for receiving fasteners therethrough to attach the cladding element to the structure.

According to yet another preferred embodiment of the invention, the male fastener further includes a longitudinal tongue integrally formed with and offset from the mounting strip. The tongue is adapted for residing a spaced distance from the surface of the structure for entering a complementary fastener of an adjacent cladding element.

According to yet another preferred embodiment of the invention, the longitudinal tongue of the male fastener includes a inside shoulder for cooperating with an interfering shoulder formed with a complementary fastener of an adjacent cladding element to align the cladding elements on the surface of the underlying structure.

According to yet another preferred embodiment of the invention, the male fastener further includes a longitudinal side wall opposite the tongue and extending generally perpendicular to the mounting strip to the inside major surface of the panel.

According to yet another preferred embodiment of the invention, a notch is formed at the junction of the side wall of the male fastener and the panel for being cut through to remove the male fastener from the panel.

According to one preferred embodiment of the invention, the first female fastener includes a generally L-shaped longitudinal extension integrally formed with the inside major surface of the panel and cooperating with the panel to define a channel open to the second side of the panel and adapted for receiving therein a complementary fastener of an adjacent cladding element.

According to one preferred embodiment of the invention, the second female fastener includes a generally L-shaped longitudinal extension integrally formed with the inside major surface of the panel and cooperating with the panel to define a channel open to the first side of the panel and adapted for receiving therein a complementary fastener of an adjacent cladding element.

According to yet another preferred embodiment of the invention, a longitudinal overhang is integrally formed along the second side of the cladding panel and extends beyond the first female fastener for covering a complementary fastener of an adjacent cladding element positioned on the second side of the panel.

In another embodiment, a modular cladding element cooperates with an assembly of cladding elements to clad a surface of an underlying structure. The cladding element includes a cladding panel having opposed outside and inside major surfaces, first and second opposed sides, and first and second opposed ends. A removable male fastener is integrally formed along the first side of the panel, and is adapted for entering a complementary fastener of an adjacent cladding element when positioned on the first side of the panel. A weakness area is provided for being cut through to remove the male fastener in the absence of a complementary cladding element positioned on the first side of the panel. A first female fastener is integrally formed along the opposed second side of the panel, and defines a first opening adapted for receiving a complementary fastener of an adjacent cladding element positioned on the second side of the panel. A second female fastener is integrally formed adjacent the male fastener on the first side of the panel. Upon removing the male fastener, the second female fastener defines a second opening adapted for receiving a complementary fastener of an adjacent cladding element on the first side of the panel.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
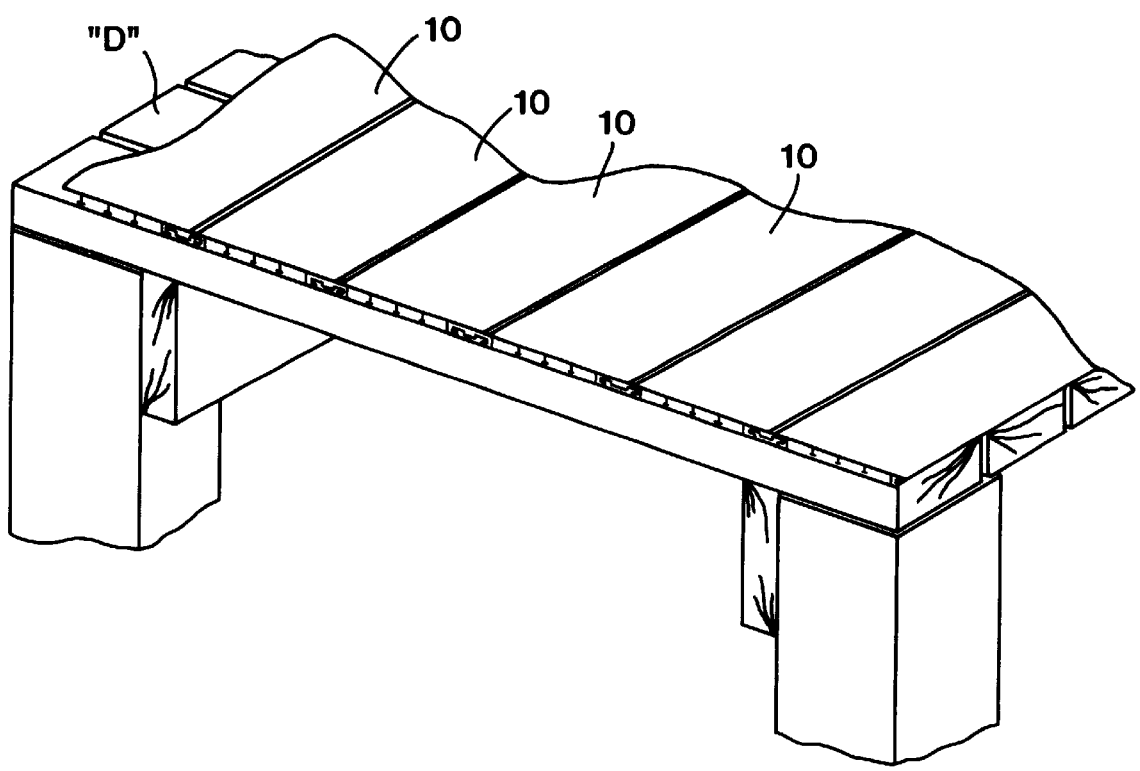
FIG. 1 is a fragmentary perspective view of an assembly of cladding elements arranged over the surface of wood deck.
Figure 2:
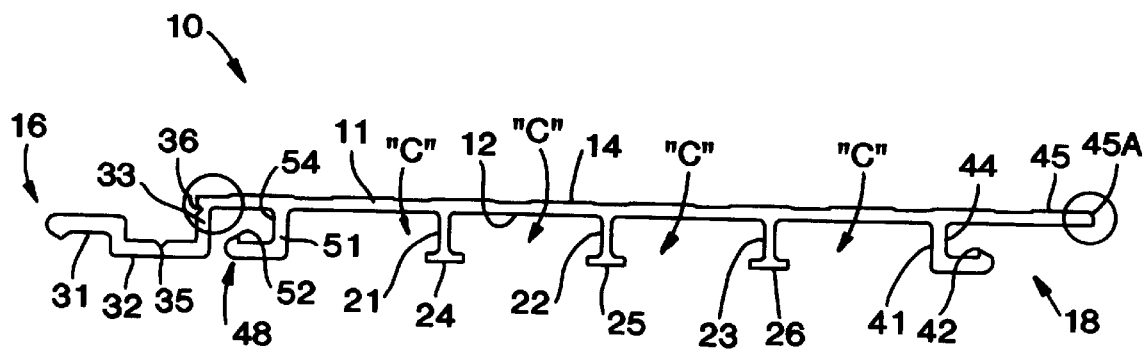
FIG. 2 is an end view of a single cladding element formed according to one preferred embodiment of the invention.

Referring now specifically to the drawings, a modular cladding element according to the present invention is illustrated in FIG. 1 and shown generally at reference numeral 10. The cladding element 10 is particularly applicable for being assembled together with a number of other elements to clad the surface of a wood deck "D" or other underlying structure. The cladding elements 10 cooperate to provide a generally maintenance free, wear-resistant surface that is attractive, easy to clean, convenient to install, and relatively inexpensive. Preferably, each cladding element 10 is integrally molded of a durable PVC plastic. A single cladding element 10 is described below with reference to FIG. 2.

The cladding element 10 includes a panel 11 with inside and outside major surfaces 12 and 14, and complementary male and female fasteners 16 and 18 extending along respective opposing sides. A number of spaced longitudinal support ribs 21, 22, and 23 are formed with the inside major surface 12 of the panel 11 and extend perpendicularly outward to support the panel 11 a spaced distance above the surface of the wood deck "D". The support ribs 21, 22, and 23 extend from one end of the panel 11 to the other, and cooperate to prevent the panel 11 from collapsing under normal use and wear. The ribs 21, 22, and 23 further define respective air circulation channels "C" for allowing air flow through the space between the cladding panel 11 and deck surface. The air circulation channels "C" promote moisture evaporation and reduce warping and cupping of the underlying wood structure. Longitudinal flanges 24, 25, and 26 are formed with the ribs 21, 22, and 23 for engaging the deck surface and providing reinforced support.

The outside major surface 14 of the cladding panel 11 preferably includes texture ridges 28 (See FIG. 3) laterally spaced apart and extending from one end of the cladding panel 11 to the other. The ridges 28 provide increased slip resistance, and cooperate to move water away from the surface of the cladding element 10.

Figure 3:
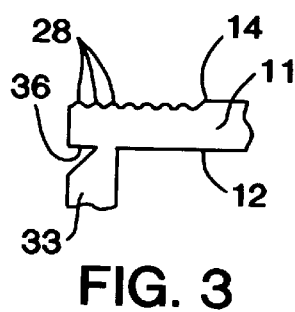
FIG. 3 is an enlarged fragmentary view of a portion of the cladding element and showing the longitudinal notch for being cut through to separate the male fastener from the cladding panel.

The male fastener 16 is integrally formed along one side of the cladding panel 10, and includes a longitudinal tongue 31, mounting strip 32, and side wall 33. The tongue 31 extends from one end of the panel 11 to the other, and includes a downward protruding shoulder 34 formed at its free edge. The mounting strip 32 is formed with an opposite edge of the tongue 31, and is offset from the tongue 31 to engage the surface of the deck "D". A longitudinal fastener groove 35 is formed in the mounting strip 32 and adapted for receiving wood screws or other suitable fasteners (not shown) through the strip 32 and into the deck surface to secure the cladding element 10 to the deck "D". The side wall 33 of the male fastener 16 extends perpendicularly upward from the mounting strip 32 to the inside major surface 12 of the panel 11. As best shown in FIG. 3, a longitudinal notch 36 is formed at the junction of the side wall 33 and panel 11, and defines a weakness area for being cut through using a hand saw or other suitable tool to remove the male fastener 16 from the panel 11.

The female fastener 18 is located along a side of the panel 11 opposite the male fastener 16, and includes a generally L-shaped extension 41 formed with the inside major surface 12 of the panel 11. An upward protruding, locking shoulder 42 is formed along a free edge of the extension 41. The extension 41 and panel 11 cooperate to define a fastener channel 44 open to the outside of the panel 11, and in substantial axial alignment with the longitudinal tongue 31 of the male fastener 16. The depth of the fastener channel 44 is preferably at least twice as great as its width in order to form a lateral adjustment zone within which the male fastener of an adjacent cladding element can extend. The lateral adjustment zone permits slight position adjustment of the adjacent cladding element based on the degree to which its male fastener is inserted within the channel 44.

Figure 4:
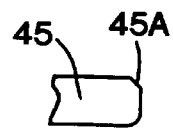
FIG. 4 is an enlarged fragmentary view of a portion of the cladding element and showing the beveled end edge of the overhang.

A longitudinal overhang 45 is formed with the side edge of the panel 11 adjacent the female fastener 18, and is adapted to extend outwardly a distance corresponding generally to the lateral dimension of the tongue 31 and mounting strip 32. The edge 45A of the overhang 45 is preferably beveled, as shown in FIG. 4, to smooth the transition from one cladding element 10 to another.

A second female fastener 48 is formed adjacent the male fastener 16 on a side of the panel 11 opposite the first female fastener 18, and includes a generally L-shaped extension 51 formed with the inside surface 12 of the panel 11. An upward protruding, locking shoulder 52 is formed along a free edge of the extension 51. The extension 51 and panel 11 cooperate to define a second fastener channel 54 open to the outside of the panel 11, and in substantial axial alignment with the longitudinal tongue 31 of the male fastener 16.

Figure 5:
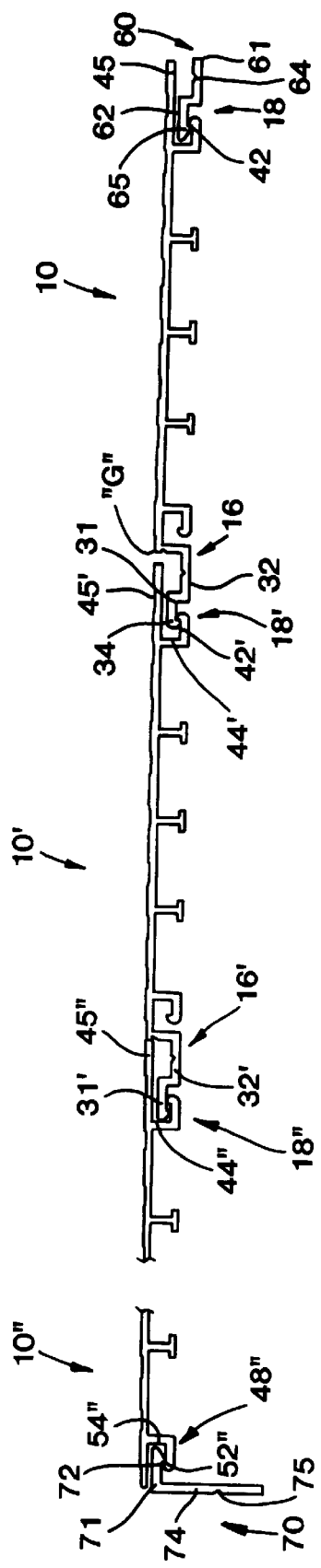
FIG. 5 is an end view of a plurality of cladding elements in an assembled, interlocking condition.
Figure 6:
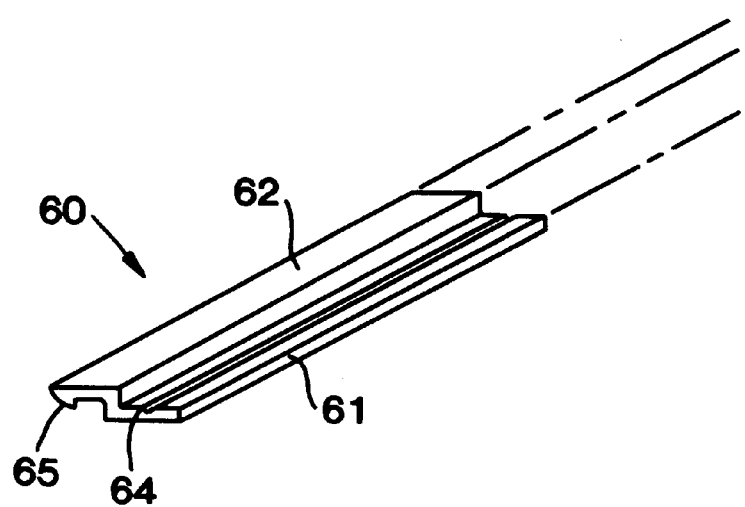
FIG. 6 is a perspective view of the cladding starter strip.
Figure 7:
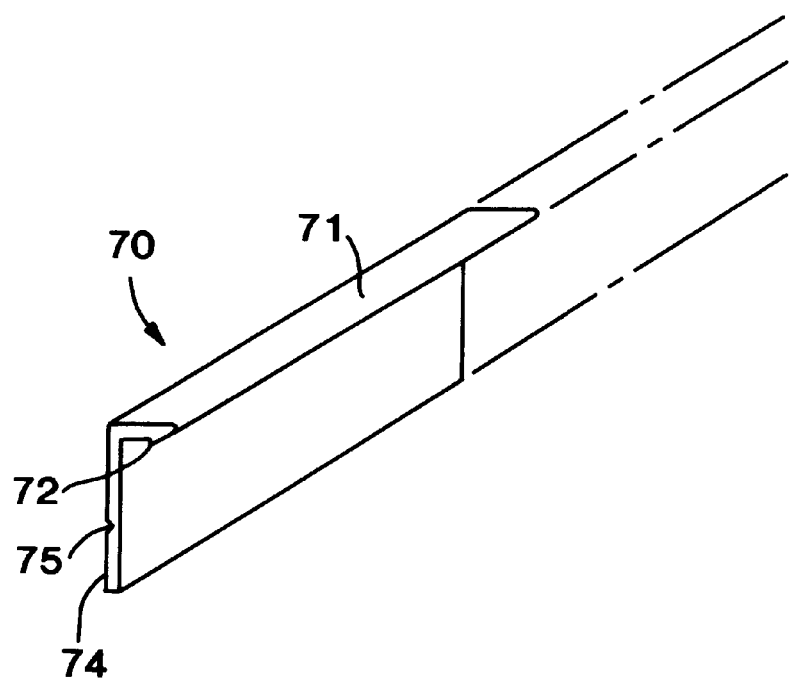
FIG. 7 is a perspective view of the cladding side strip.

FIGS. 5–7 show a number of cladding elements 10, 10', and 10" in an assembled, interlocking condition. Like elements previously described are indicated in prime and double prime notation. To begin cladding, a longitudinal starter strip 60 is first attached along one edge of the deck surface. The cladding starter strip 60, shown in FIGS. 5 and 6, includes an integrally formed mounting section 61 and tongue 62. The mounting section 61 has a longitudinal groove 64 defining a weakness area for receiving wood screws through the strip and into the deck surface. The tongue 62 is offset from the mounting section 61 a distance sufficient to mate with the fastener channel 44 of an adjacent cladding element 10. A downward protruding locking shoulder 65 is formed with the tongue 62 and cooperates with the shoulder 42 of the female fastener 18 to properly align and hold the cladding element 10 in position. Screws are received through the mounting strip 32 of the male fastener 16 on an opposite side of the cladding element 10 to secure the cladding element 10 to the deck surface. The overhang 45 substantially covers the cladding starter strip 60 and conceals the screws to provide a more attractive, finished look.

The second, adjacent cladding element 10' is positioned alongside the first cladding element 10 and properly aligned by mating the tongue 31 and channel 44' of the male and female fasteners 16 and 18'. The interfering locking shoulders 34 and 42' cooperate to hold the cladding element 10' in position as screws are received through the mounting strip 32' of the male fastener 16' on the opposite side of the cladding element 10'. In the embodiment shown, the tongue 31 is positioned towards the front of the channel 44' within the lateral adjustment zone such that a slight longitudinal gap "G" is formed between the overhang 45' and cladding panel 11. The gap "G" allows quick movement of water away from the surface of the cladding elements, and may increase the overall aesthetic appearance of the cladded structure. The overhang 45' substantially covers the male fastener 16 of the cladding element 10 to provide a relatively seamless transition from one cladding element to the other 10'. Successive cladding elements 10" are arranged on the deck surface in an identical manner. Thus, the female fastener 18" of cladding element 10" receives the tongue 31' of the male fastener 16' within the channel 44". In this case, the tongue 31' is positioned towards the back of the channel 44" in order to substantially close the gap between the overhang 45" and cladding panel 11'.

When an opposite edge of the deck surface is reached, the male fastener of the cladding element 10" is removed, as described above, and a cladding side strip 70, shown in FIGS. 5 and 7, is applied to the edge of the deck "D" to finish the cladding. The side strip 70 has a longitudinal tongue 71 with a downward protruding shoulder 72 and an integrally formed mounting section 74 extending perpendicular to the tongue 71. The tongue 71 enters the channel 54" of the second female fastener 48" and is properly aligned and held in position by the interfering shoulders 72 and 52". Screws are received through a longitudinal fastener groove 75 formed in the mounting section 74 to secure the cladding side strip 70 to the deck "D".

A modular cladding element is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A modular cladding element for cooperating with an assembly of cladding elements to clad a surface of an underlying structure, said cladding element comprising:
    (a) a cladding panel having opposed inside and outside major surfaces, first and second opposed sides, and first and second opposed ends;
    (b) a removable male fastener integrally formed along the first side of said panel and adapted for entering a complementary fastener of a adjacent cladding element when positioned on the first side of said panel, and in the absence of a complementary cladding element, said male fastener is removable from said panel;
    (c) a first female fastener integrally formed along the opposed second side of said panel, and defining a first opening adapted for receiving a complementary fastener of an adjacent cladding element positioned on the second side of said panel; and
    (d) a second female fastener integrally formed adjacent said male fastener on the first side of said panel, and upon removing said male fastener, said second female fastener defining a second opening adapted for receiving a complementary fastener of an adjacent cladding element on the first side of said panel.

2. A modular cladding element according to claim 1, wherein said cladding panel comprises a plurality of spaced-apart supporting ribs extending perpendicularly outward from the inside major surface and longitudinally from one end of said panel to the other, said ribs adapted for spacing the outside major surface of said panel a distance away from the surface of the underlying structure.

3. A modular cladding element according to claim 1, wherein said male fastener comprises an integrally formed, longitudinal mounting strip adapted for engaging the surface of the underlying structure and for receiving fasteners therethrough to attach said cladding element to the structure.

4. A modular cladding element according to claim 3, wherein said male fastener further comprises a longitudinal tongue integrally formed with and offset from said mounting strip, and adapted for residing a spaced distance from the surface of the structure for entering a complementary fastener of an adjacent cladding element.

5. A modular cladding element according to claim 4, wherein the longitudinal tongue of said male fastener comprises a inside shoulder for cooperating with an interfering shoulder formed with a complementary fastener of an adjacent cladding element to align the cladding elements on the surface of the underlying structure.

6. A modular cladding element according to claim 4, wherein said male fastener further comprises a longitudinal side wall opposite said tongue and extending generally perpendicular to said mounting strip to the inside major surface of said panel.

7. A modular cladding element according to claim 6, and comprising a notch formed at the junction of the side wall of said male fastener and said panel for being cut through to remove said male fastener from said panel.

8. A modular cladding element according to claim 1, wherein said first female fastener comprises a generally L-shaped longitudinal extension integrally formed with the inside major surface of said panel and cooperating with said panel to define a channel adapted for receiving therein a complementary fastener of an adjacent cladding element.

9. A modular cladding element according to claim 1, wherein said second female fastener comprises a generally L-shaped longitudinal extension integrally formed with the inside major surface of said panel and cooperating with said panel to define a channel adapted for receiving therein a complementary fastener of an adjacent cladding element.

10. A modular cladding element according to claim 1, and comprising a longitudinal overhang integrally formed along the second side of said cladding panel and extending beyond said first female fastener for covering a complementary fastener of an adjacent cladding element positioned on the second side of said panel.

11. A modular cladding element for cooperating with an assembly of cladding elements to clad a surface of an underlying structure, said cladding element comprising:
   (a) a cladding panel having opposed outside and inside major surfaces, first and second opposed sides, and first and second opposed ends;
   (b) a removable male fastener integrally formed along the first side of said panel and adapted for entering a complementary fastener of an adjacent cladding element when positioned on the first side of said panel, and including a weakness area for being cut through to remove said male fastener in the absence of a complementary cladding element positioned on the first side of said panel;
   (c) a first female fastener integrally formed along the opposed second side of said panel, and defining a first opening adapted for receiving a complementary fastener of an adjacent cladding element positioned on the second side of said panel; and
   (d) a second female fastener integrally formed adjacent said male fastener on the first side of said panel, and upon removing said male fastener, said second female fastener defining a second opening adapted for receiving a complementary fastener of an adjacent cladding element on the first side of said panel.

* * * * *